W. F. EMERSON.
GREASE CUP.
APPLICATION FILED APR. 28, 1917.
1,293,386.
Patented Feb. 4, 1919.
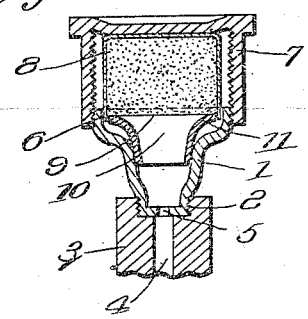
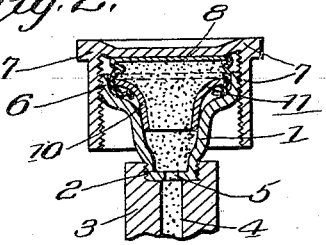
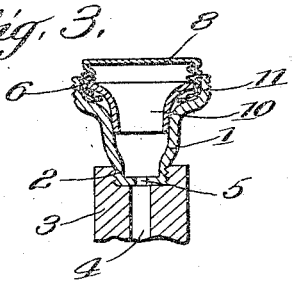
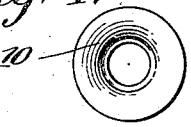
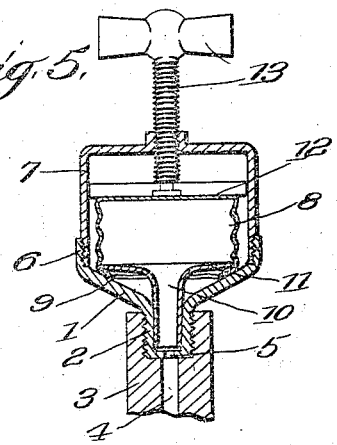
Inventor
William F. Emerson
By his Attorney
Alfred Wilkinson

UNITED STATES PATENT OFFICE.

WILLIAM FREDERICK EMERSON, OF BUFFALO, NEW YORK, ASSIGNOR TO BUFFALO METAL GOODS COMPANY, OF BUFFALO, NEW YORK, A CORPORATION OF NEW YORK.

GREASE-CUP.

1,293,386.  Specification of Letters Patent.  Patented Feb. 4, 1919.

Application filed April 28, 1917.  Serial No. 165,258.

*To all whom it may concern:*

Be it known that I, WILLIAM F. EMERSON, a citizen of the United States, residing at Buffalo, in the county of Erie and State of New York, have invented new and useful Improvements in Grease-Cups, of which the following is a specification.

This invention relates to grease cups for feeding lubricating grease to bearings and consists of a particularly simple and compact means for adapting grease cups for the use therewith of protectively inclosed charges of grease or grease capsules wherein the grease is contained within a paper or other container. An important feature of my invention consists in providing an insert for the cup of a form which will permit of its being inexpensively stamped of sheet metal and which will provide a shoulder positioned to be engaged by the collapsed grease container and will retain the container in exposed position when the cap portion is removed thus greatly facilitating the removal of the emptied container which is held in position permitting of its being pushed off without soiling of the hands.

An approved embodiment of my present invention is illustrated in the accompanying drawing wherein the reference numerals of this description are applied to the corresponding parts in the several views. Therein Figure 1 is a vertical sectional view showing a grease cup embodying my invention. Fig. 2 is a similar view showing the parts in advanced position and Fig. 3 is a similar sectional view with the cap removed and Fig. 4 is a plan view of the ferrule insert. Fig. 5 is a vertical sectional view illustrating my invention embodied in a desirable plunger type of grease cup.

In the embodiment of my invention disclosed in the drawing 1 indicates the base portion provided with a threaded flange portion 2 adapted to be threaded into a suitable bearing support 3 provided with a duct 4 communicating with the bearing or other parts to be lubricated. The base 1 is provided as shown with a central passage or outlet 5 for the lubricant communicating with the duct 4 and is also provided on its peripheral portion 6 with threads as shown. Upon the threads 6 there is screwed the grease cup cap 7 adapted to receive a charge of grease therein and to apply pressure thereon as the cap is screwed down as indicated in Fig. 2 to force the grease into the bearing. In so far as described the parts may be of the usual and standard form of commercial automobile grease cup to which my present invention is particularly applicable.

In accordance with my invention the described type of grease cup is adapted to deliver the lubricant when put up in containers 8 as shown which are desirably of paper and of the proper size to be received within the cup portion 7 wherein it is placed with the open end 9 toward the base outlet 5. In operation the cap is then screwed down on the base 1 and the container collapsed to expel the grease through the outlet 5 into the bearing.

To permit of successfully employing the grease capsules as shown I have provided means to prevent the crushed container adhering to the inside of the cap portion when the cap is removed which as will be readily understood would necessitate troublesome manipulation to accomplish its removal. To this end I have devised a simple insert or ferrule 10 of suitable form to be inserted within the base portion 1 and to provide an annular flange or shoulder 11 spaced from the interior surface of the base in a manner which permits of the lower edge of the container being forced thereunder as it is collapsed. The insert 10 is desirably of the flared tubular form as shown which permits of its being inexpensively stamped up of sheet metal and permits of the passage of the grease therethrough. The lower tubular portion of the insert is designed to hold it firmly in position on the base portion by forcing it into the latter so as to obtain a frictional hold thereon by means of the inclined engaging surfaces.

The insert thus provided permits of readily converting the standard grease cups to be adapted for use with grease capsules and moreover is equally suitable for handling the loose grease in the customary manner.

In Fig. 5 I have shown my invention applied to the plunger type of grease cup wherein the grease is advanced by means of a plunger 12 operated by a hand screw 13 threaded to the cap portion.

It will be understood that many modifications of my invention can be made without departing from the scope thereof and it is therefore intended that all matter contained herein shall be interpreted as illustrative and not in a limiting sense.

Having described my invention I claim,

1. A grease cup having a base portion provided with a passage for the grease, means for advancing the grease therethrough and in combination therewith means for adapting the same for use with grease within containers comprising an insert element positioned within the base and adapted to be engaged by the container when collapsed substantially as described.

2. A grease cup having a base portion provided with an outlet passage for the grease, means for advancing the grease therethrough and a separable insert element adapted to be positioned within the base and provided with an annular shoulder adapted to be engaged by a collapsed container substantially as described.

3. A grease cup having a base portion provided with an outlet passage for the grease, means for advancing the grease therethrough and in combination therewith means for adapting the same for use with grease within containers comprising a tubular insert element having a flared shoulder portion suitably spaced from the wall of the cup to permit of the container engaging thereunder when collapsed, substantially as described.

4. A grease cup comprising a base member provided with an outlet passage for the grease, a cap member threaded thereto and adapted to receive a grease charge protectively inclosed within a container, and in combination therewith an insert element adapted to be positioned within the base and to provide a shoulder to be engaged by the container and said base and insert element having inclined engaging surfaces for retaining the said insert in position substantially as described.

5. An insert element for use in grease cups of standard construction to adapt them for use with grease in collapsible containers, comprising a tubular element having a reduced lower portion adapted for frictional holding engagement with the cup and formed at its upper portion with a shoulder flange spaced from the cup and adapted to be engaged by a collapsed container, substantially as described.

In testimony whereof I have signed my name to this specification.

WILLIAM FREDERICK EMERSON.